(12) United States Patent
Park (10) Patent No.: US 7,609,582 B2
(45) Date of Patent: Oct. 27, 2009

(54) BRANCH TARGET BUFFER AND METHOD OF USE

(75) Inventor: Gi Ho Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 27 days.

(21) Appl. No.: 12/052,762

(22) Filed: Mar. 21, 2008

(65) Prior Publication Data

US 2008/0168263 A1 Jul. 10, 2008

Related U.S. Application Data

(62) Division of application No. 11/080,986, filed on Mar. 16, 2005, now Pat. No. 7,471,574.

(30) Foreign Application Priority Data

Jul. 16, 2004 (KR) .......................... 2004-0055635

(51) Int. Cl.
G11C 8/00 (2006.01)
(52) U.S. Cl. .............................. 365/230.08; 365/189.05
(58) Field of Classification Search ............ 365/230.08, 365/189.05
See application file for complete search history.

(56) References Cited

U.S. PATENT DOCUMENTS

| 5,732,253 A | 3/1998 | McMahan |
| 5,740,415 A | 4/1998 | Hara |
| 5,740,417 A | 4/1998 | Kennedy et al. |
| 5,946,705 A | 8/1999 | Cumming et al. |
| 5,948,100 A | 9/1999 | Hsu et al. |
| 6,011,908 A | 1/2000 | Wing et al. |
| 6,263,427 B1 | 7/2001 | Cummins et al. |
| 6,366,990 B1 | 4/2002 | Guddat et al. |
| 6,647,490 B2 * | 11/2003 | Keller et al. ................. 712/233 |
| 6,678,815 B1 | 1/2004 | Mathews et al. |
| 2003/0028758 A1 | 2/2003 | Kacevas |

FOREIGN PATENT DOCUMENTS

| JP | 2278428 | 11/1990 |
| JP | 7186862 | 7/1995 |
| JP | 07210383 | 8/1995 |
| JP | 08077000 | 3/1996 |
| JP | 2000322257 | 11/2000 |
| KR | 1999014132 | 2/1999 |
| KR | 1020030007952 A | 1/2003 |
| KR | 1020050039259 A | 4/2005 |
| WO | 0197021 A1 | 12/2001 |

* cited by examiner

Primary Examiner—Son Dinh
(74) Attorney, Agent, or Firm—Volentine & Whitt, PLLC (57) ABSTRACT

A branch target buffer (BTB) storing a data entry related to a branch instruction is disclosed. The BTB conditionally enables access to the data entry in response to a word line gating circuit associated with a word line in the BTB. The word line gating circuit stores a word line gating value derived from branch history data related to the instruction. Additionally, a branch prediction unit and a processor incorporating the BTB are disclosed, along with methods for operating the BTB.

9 Claims, 9 Drawing Sheets

BRANCH TARGET BUFFER AND METHOD OF USE

CROSS-REFERENCE TO RELATED APPLICATIONS

This is a divisional of application Ser. No. 11/080,986, filed Mar. 16, 2005, which is incorporated herein by reference in its entirety.

BACKGROUND OF THE INVENTION

1. Field of the Invention

The present invention relates generally to processors having a branch prediction unit, and more particularly to a branch target buffer (BTB) within the branch prediction unit. The invention is adapted for use with processors having pipelined architectures, including both single and superscalar pipelined architectures.

2. Description of the Related Art

Early computers where designed to finish processing one instruction before beginning the next instruction in a sequence of instructions. Over the years, major architectural advances have been made to these early designs that dramatically improve performance. Pipelined and superscalar architectures are examples of these advances.

Processor performance has also been enhanced by the uses of caches. Caches are memory elements used to store and provide frequently used information. The term "information" broadly includes both data and instructions. Caches typically provide information in a single clock cycle, as compared with conventional memory access operations which may require several cycles. The so-called Branch Target Buffer ("BTB") is one example of a processor cache.

The utility of a BTB is readily understood in the context of a pipelined architecture. "Pipelining" (or "speculative execution", as it is also known) is a term generally referring to an operating approach in which a sequence of instructions is processed using a series of functional steps or processing stages. Each processing stage usually accomplishes its constituent operation(s) within a single clock cycle.

Unlike a non-pipelined processor that processes each instruction to completion before beginning the next instruction, a pipelined processor simultaneously processes several instructions in different processing stages of the pipeline. Pipeline stages may be arbitrarily designated by a designer, but generally include; instruction fetching, instruction decoding, instruction execution, and execution resolution stages.

An instruction fetch stage retrieves an instruction from wherever it is currently stored (e.g., a main system memory or an instruction queue). Once fetched, the instruction is passed to a decoder stage that typically determines an instruction address and/or instruction operand. From the decoder stage, the instruction passes to an execution stage that executes one or more operations indicated by the instruction. The execution resolution stage generally involves writing-back the results (e.g., results data) generated by execution of the instruction to one or more registers or memories for later use.

An instruction preferably passes from one pipeline stage to the next during a prescribed period. Thus during a first period, the instruction fetch stage fetches a first instruction from storage and aligns it within associated hardware register(s) for decoding. During a second period, the instruction fetch stage fetches a second instruction from storage and aligns it, while the instruction decoder stage decodes the first instruction. During a third period, the first instruction initiates an execution operation (e.g., a logical, mathematical, address-ing, or indexing operation) in the execution stage, while the instruction decoder stage decodes the second instruction, and the instruction fetch stage fetches a third instruction. Pipelining continues through execution resolution, and in this manner the overall operating speed of the processor is dramatically improved over non-pipelined architectures.

In a superscalar architecture, two or more instructions may be processed and/or executed simultaneously. That is, superscalar systems have two or more execution (or decode/execution) paths capable of simultaneously and independently executing a plurality of instructions in parallel. Scalar systems may only execute one instruction per period, whether the instruction emerges from a pipelined sequence of instructions, or is executed in a non-pipelined manner. The simultaneous execution of multiple instructions further increases the performance of a processor.

Pipelining provides unquestioned performance benefits, so long as the sequence of instructions to be processed remains highly linear, or predictable. Unfortunately, most instruction sequences contain numerous instructions capable of introducing non-sequential execution paths. So-called "branch instructions" (including, for example, jump, return, and conditional branch instructions) produce a significant performance penalty in a pipelined processor—unless an effective form of branch prediction is implemented. The performance penalty arises where an unpredicted (or erroneously predicted) branch instruction causes a departure from the sequence of instructions currently pipelined within the processor. Where this occurs, the currently pipelined sequence of instructions must be throw out or "flushed," and a new sequence of instructions must be loaded into the pipeline. Pipeline flushes waste numerous clock cycles and generally slow the execution of the processor.

One way to increase execution performance associated with a branch instruction is to predict the outcome of the branch instruction, and insert a predicted instruction into the pipeline immediately following the branch instruction. If such a branch prediction mechanism is successfully implemented in a processor, then the performance penalty associated with pipeline flushes is incurred only if the branch instruction outcome is incorrectly predicted. Fortunately, conventional techniques and analyses have determined that the outcome of many branch instructions can be correctly predicted with a high degree of certainty—approaching 80% for some applications.

As a result, several conventional types of branch prediction mechanisms have been developed. One type of branch prediction mechanism uses a BTB to store numerous data entries, wherein each data entry is associated with a branch instruction. The BTB thus stores a number of so-called "branch address tags," each branch address tag serving as an index of sorts for a corresponding branch instruction. In addition to the branch address tag, each BTB entry may further include a target address, an instruction opcode, branch history information, and possibly other data. In a processor utilizing a BTB, the branch prediction mechanism monitors each instruction entering the pipeline. Usually, the instruction address is monitored, and where the instruction address matches an entry in the BTB, the instruction is identified as a branch instruction. From associated branch history information, the branch prediction mechanism determines whether or not the branch is likely to be taken. Branch history information is typically determined by a state machine that monitors each branch instruction indexed in the BTB and defines data stored as branch history information in relation to whether or not the branch has been taken in preceding operations.

Where the branch history information indicates that the branch instruction is likely to be taken, one or more predicted instruction(s) is inserted in the pipeline. Conventionally, each BTB data entry includes opcode(s) associated with the branch instruction being evaluated in relation to its branch history information. Upon an appropriate indication from the branch prediction mechanism, these opcode(s) may be inserted directly into the pipeline. Also, each BTB data entry includes a "target address" associated with the branch instruction being evaluated. Again, upon an appropriate indication from the branch prediction mechanism, this target address is output by the branch prediction unit as a "predicted address" and used to fetch the next instruction in the instruction sequence.

Processing of the branch instruction and its succeeding instructions proceeds through the pipeline for several periods until the branch instruction has been executed in the execution stage. It is only at this point that accuracy of the branch prediction becomes known. If the outcome of the branch instruction was correctly predicted, the branch target address has already been moved through the pipeline in its proper order, and processor execution may continue without interruption. However, if the outcome of the branch instruction was incorrectly predicted, the pipeline is flushed and a correct instruction or instruction sequence is inserted in the pipeline. In a superscalar processor, which has two or more pipelines processing multiple instruction sequences, the performance penalty caused by an incorrect branch prediction is even greater because, in most cases, at least twice the number of instructions must be flushed.

Figure 1:
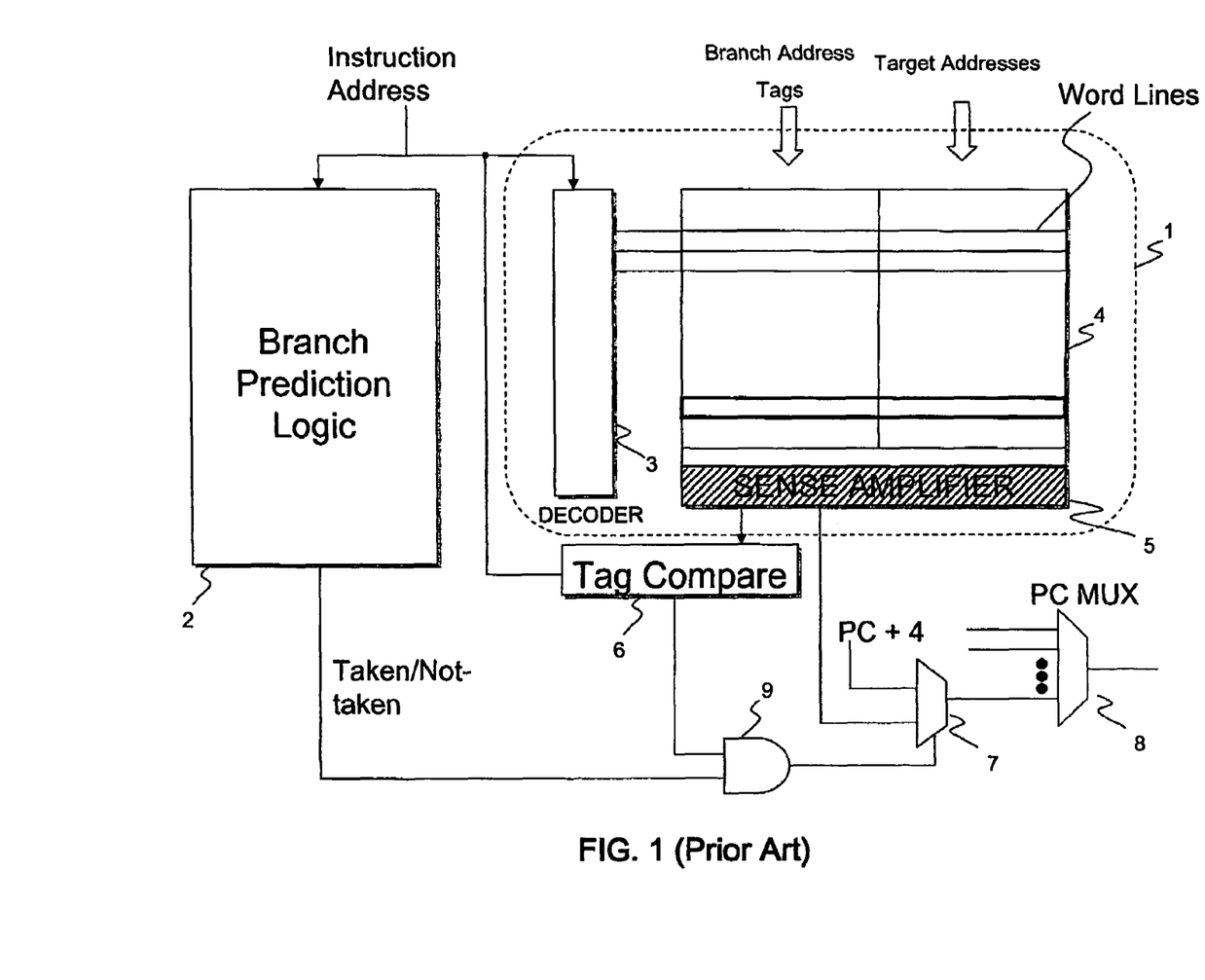
FIG. 1 illustrates a conventional branch target buffer (BTB) and related components required to output a data entry from the BTB memory array.

FIG. 1 illustrates a conventional BTB 1 connected to branch prediction logic 2 and related hardware. BTB 1 generally comprises an instruction address decoder 3, a memory array 4, and a sense amplifier 5. Address decoder 3 receives an instruction address from an instruction fetch unit and selects a word line associated with the decoded instruction address. Word line selection is conventionally performed, but typically includes applying a word line voltage to the selected word line. As is customary, a plurality of word lines extend from address decoder 3 through memory array 4 in a row-wise manner.

Memory array 4 comprises numerous memory cells each storing at least one data bit. Data entries, each comprising a number of data bits, are conveniently stored in rows such that selection of a particular word line essentially accesses a corresponding data entry. Data entries include at least one data field defining a branch address tag and another data field defining a target address. A word line-selected data entry is conventionally output from memory array 4 through sense amplifier 5.

From sense amplifier 5, the branch address tag is communicated to a tag compare register 6 which also receives the instruction address. The target address from sense amplifier 5 is communicated to multiplexer 7, along with an address associated with the non-branching sequence of instructions (e.g., a program counter value +4 for a 32-bit instruction word processor). One of these two multiplexer inputs is selected for communication to the instruction queue (shown here a PC multiplexer 8) by operation of a logic gate 9 receiving results from tag compare register 6 and a Taken/Not-Taken indication from branch prediction logic 2.

This type of conventional BTB suffers from a number of drawbacks. First, left in the configuration shown in FIG. 1, the memory array of the BTB will be accessed by every branch instruction, without regard to the likely outcome of the instruction. BTB access typically involves executing a conventional READ operation in relation to the word line selected by the address decoder. Each READ operation draws power from a supply in order to energize the plurality of memory cells associated with the selected word line and output data from these memory cells.

In response to this wasteful state of affairs, other conventional BTB designs have integrated an enable line into the memory array design. U.S. Pat. No. 5,740,417 is an example. As shown in this document, the proposed BTB includes an enable line which enables or disables word line drivers associated with the memory array during READ operations. The word line drivers are enabled or disabled on the basis of a Taken/Not-Taken state which predicts whether a particular instruction is unlikely to be taken or not. For example, where a Taken/Not-Taken state for a particular instruction indicates a "strongly not taken" state, the enable line transitions to an inactive level, thereby disabling the memory array word line drivers.

Unfortunately, this conventional approach to saving power during BTB access operations comes with high overhead. Namely, the branch prediction mechanism generating the enable signal requires both time and resources to "pre-decode" the instruction, determine its branch history data and Taken/Not-Taken state, and thereafter change, as necessary, the level of the enable signal.

As the rate of instruction execution and the depth of instruction pipelines increase, the accuracy and speed of branch predictions becomes increasingly important. Recognizing this importance, many conventional processors incorporate extensive pre-decoding schemes whereby all instructions are evaluated, branch instructions are identified, and branch history information is either retrieved or dynamically calculated in relation to a branch instruction currently being evaluated and pre-decoded. Needless to say, such approaches to predicting branch instruction behavior takes considerable time and requires significant additional resources. Additional delay and complexity in the processing of instruction sequences are not desirable attributes in a branch prediction mechanism. Yet, this is exactly what many conventional approaches provide.

The issue of power consumption further complicates the design of competent branch prediction mechanisms. Not surprisingly, contemporary processors are finding application is a range of devices characterized by serious constraints upon power consumption. Laptop computers and mobile devices, such as handsets and PDAs, are ready examples of devices incorporating processors preferably consuming a minimum of power.

As noted above, the BTB is a cache type memory storing a potentially numerous number of data entries. Thus, the BTB has at its core a memory array, and preferably a volatile memory array. Such memory arrays, and particularly ones sufficiently large to store numerous data entries, are notoriously power hunger. Each access to the BTB by the branch prediction mechanism implicates a "READ" operation to the BTB memory array. All agree that BTB access operations are increasing, and some estimates suggest that READ operations to the BTB memory array account for as much as 10% of the overall power consumption in conventional processors.

Clearly, a better approach to the implementation of branch prediction mechanisms within emerging processors is called for. Conventional approaches requiring lengthy, real-time evaluation of branch instructions and/or the dynamic retrieval or calculation of branch history information are too complex and slow. Further, the power consumption caused by incessantly, yet necessarily in many conventional approaches, accessing the BTB memory array is simply wasteful.

SUMMARY OF THE INVENTION

In one embodiment, the present invention provides a branch target buffer (BTB) memory array comprising a word line and an associated word line gating circuit. The word line gating circuit comprises a memory circuit storing a word line gating value.

The memory array is preferably adapted to store a data entry in relation to the word line. The word line gating circuit preferably comprises a gating logic circuit in addition to the memory circuit storing the word line gating value. In one specific example, the word line gating circuit responses to a word line voltage applied to the word line and the word line gating value in order to enable an access operation to the entry data. The access operation may be a WRITE operation responsive to a WRITE signal received in the BTB, or a READ operation applied to the memory array in relation to the word line.

The BTB memory array preferably comprises an array of volatile memory cells. In one specific example, the memory array comprises an SRAM array and the memory circuit in the word line gating circuit comprises a 1-bit SRAM cell.

In a related specific example, the gating logic circuit comprises a first logic gate receiving as inputs the word line voltage and the stored word line gating value to generate a first logic output, and a second logic gate receiving as inputs the first logic output and the WRITE signal to generate a second logic signal.

The present invention also provides a BTB memory array storing a data entry in response to a WRITE operation and outputting the data entry in response to a READ operation. This BTB memory array preferably comprises a word line gating circuit to enable access to the data entry during the WRITE operation, and to conditionally enable access to the data entry during the READ operation in response to a word line gating value stored in the word line gating circuit. In another specific example, the word line gating circuit comprises a memory circuit to store the word line gating value, and a gating logic circuit, receiving as inputs a WRITE signal and the word line gating value, to enable access to the data entry during the WRITE operation upon a positive indication by the WRITE signal, and to conditionally enable access to the data entry during a READ operation only upon a positive indication by the word line gating value.

The memory array embodiments may be readily incorporated combined within a BTB. For example, another embodiment of the present invention provides a branch target buffer comprising a memory array having gated word lines. Each gated word line preferably comprises a selection word line portion, a word line gating circuit comprising a memory circuit to store a word line gating value, and a gated word line portion. The BTB generally also comprises a decoder receiving an instruction address to select one of the gated word lines in response to the instruction address, and a sense amplifier adapted to receive entry data from the selected gated word line in response to the instruction address received in the decoder.

In a related specific example, the sense amplifier comprises circuitry to communicate word line gating values to respective memory circuits associated with the gated word lines and/or circuitry to communicate a WRITE signal to respective word line gating circuits associated with the gated word lines.

The BTB embodiments may be readily incorporated with a branch prediction unit. One embodiment of a resulting branch prediction unit comprises a branch history unit to store branch history data, branch prediction logic to receive an instruction address, provide a predicted address, and update the branch history data, and a BTB to receive the instruction address. The BTB preferably comprises a memory array comprising gated word lines, each gated word line storing a data entry and comprising a word line gating circuit comprising a memory circuit storing a word line gating value derived from the branch history data.

In a related specific example, the branch history unit comprises a state machine determining branch history data for an instruction in accordance with its past branching execution history.

Another embodiment of a branch prediction unit according to the present invention comprises a branch history unit to store branch history data, and a branch target buffer comprising a plurality of gated word lines, each gated word line being accessed through a word line gating circuit, wherein the branch target buffer is adapted to output a data entry in response to an instruction portion received in the branch target buffer and a word line gating value derived from the branch history data.

Embodiments of the branch prediction unit according to the present invention may be readily incorporated in a processor. For example the processor comprises an instruction fetch unit to receive an instruction and provide a corresponding instruction address, a branch prediction unit to receive the instruction address and provide a predicted address to the instruction fetch unit, and an instruction decoder/execution unit to receive the instruction, provide a decoded instruction, and provide an updated address in response to the decoded instruction.

In one specific example, the branch prediction unit incorporated into the processor comprises a branch history unit to store branch history data, branch prediction logic to receive the instruction address and the updated address, to provide the predicted address, and to update the branch history data, and a branch target buffer to receive the instruction address and output entry data. The branch target buffer preferably comprises a memory array like the embodiments described above.

The present invention is readily applicable to superscalar processors in which the foregoing decoder/execution unit comprises a plurality of execution paths, each comprising a separate decoder and execution unit. Examples of superscalar processors include, without limitation, vector processors and single-instruction-multiple-data (SIMD) processors.

The present invention also provides various methods. One exemplary method enables a READ operation to a gated word line in a branch target buffer memory array. The method comprises; storing a word line gating value in a word line gating circuit associated with the gated word line, and conditionally enabling the READ operation in response to the word line gating value.

In a related embodiment, the method further comprises; receiving an instruction portion in the branch target buffer, selecting the gated word line in response to the instruction portion and applying a word line voltage to the selected gated word line, and conditionally enabling the READ operation in response to the word line voltage and the word line gating value.

In yet another related embodiment, the method further comprises; defining branch history data in relation to the instruction portion, and deriving the word line gating value from the branch history data.

In still another related embodiment, the method further comprises; outputting a data entry from the branch target buffer in response to an enabled READ operation.

The present invention also provides in one embodiment a method of operating a BTB like those described above. The method preferably comprises; for each one of a plurality of instructions storing a corresponding data entry in one of the plurality of gated word lines, and storing a corresponding a word line gating value in the word line gating circuit associated with the one of the plurality of gated word lines. Upon receiving a current instruction selected from the plurality of instructions, the BTB conditionally outputs the data entry corresponding to the current instruction from the BTB in relation to the corresponding stored word line gating value.

In a related embodiment, conditionally outputting the data entry further comprises; selecting a gated word line from the plurality of gated word lines in relation to the current instruction, applying a word line voltage to the selected gated word line, and gating the word line voltage through the associated word line gating circuit in response to the stored word line gating value.

After execution of the instruction, at least one word line gating value is preferably updated.

The present invention also provides in another embodiment a method of operating a branch prediction unit. The method preferably comprises storing branch history data for an instruction in a branch history unit, deriving a word line gating value from the branch history data, storing a data entry related to the instruction in a branch target buffer (BTB) memory array, wherein the data entry is accessed in the BTB memory array via a gated word line, storing the word line gating value in a word line gating circuit associated with the gated word line, and conditionally enabling output of the data entry from the BTB memory array in response to receipt of the instruction in the branch prediction unit and in relation to the stored word line gating value.

In a related embodiment, the method further comprises; updating the branch history data and the corresponding word line gating value following each instruction execution.

BRIEF DESCRIPTION OF THE DRAWINGS

The present invention is described in relation to several presently preferred embodiments illustrated in the accompanying drawings. Throughout the drawings like reference numbers indicate like exemplary elements, components, or steps. In the drawings.

DESCRIPTION OF THE EXEMPLARY EMBODIMENTS

Exemplary embodiments of the present invention are described below with reference to the corresponding drawings. These embodiments are presented as teaching examples. The actual scope of the present invention is defined by the claims that follow.

In general application, embodiments of the present invention provide a Branch Target Buffer (BTB) enabling implementation and operation of a processor having reduced power consumption, increased branch instruction processing speed, and reduced overall complexity. In one aspect, power consumption by the processor is reduced by conditionally disabling READ operations to the BTB. In a related aspect, branch instruction processing in the processor proceeds without the delay conventionally caused by the operations required to retrieve and/or calculate branch history information. In yet another aspect, the processor benefits from reduced complexity in a constituent branch prediction unit.

The term "processoc" broadly includes any digital logic device or system capable of executing or responding to an instruction sequence. The term includes, as selected examples, central processing units (CPUs), microprocessors, digital signal processors (DSPs), reduced instruction set computer (RISC) processors, vector processors, and single-instruction-multiple-data (SIMD) processors.

Figure 2:
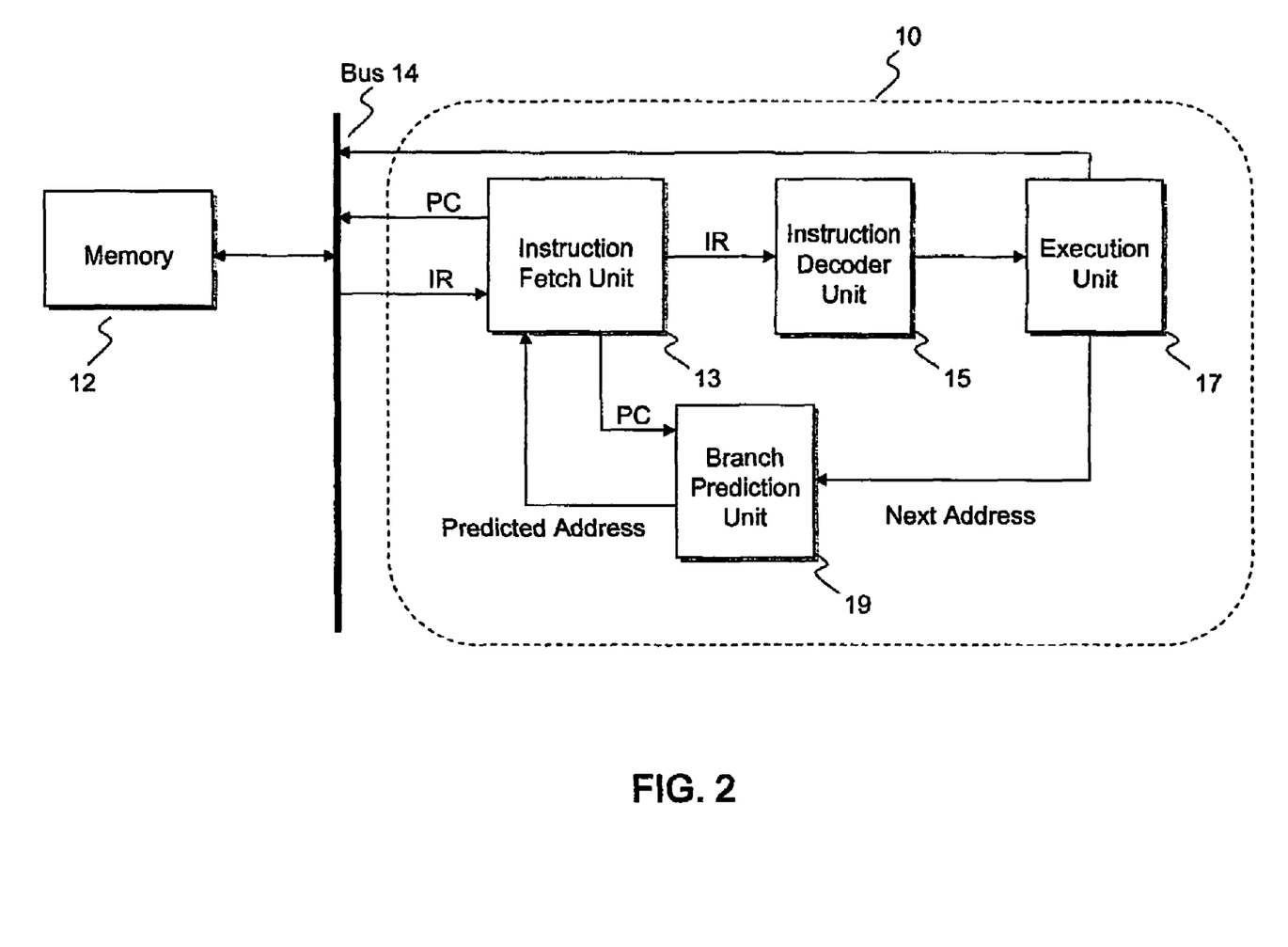
FIG. 2 is a block diagram of an exemplary processor readily adapted to incorporate a branch prediction unit and/or related methods according to the present invention.

Pipelined processors are particularly well suited for incorporation of a branch prediction unit designed in accordance with the dictate of the present invention. Accordingly, multiple pipelined processors are described as working examples that illustrate and the making and use of presenting invention, as well as some of the advantages provided by the present invention. FIG. 2 illustrates a first exemplary pipelined processor in a block level diagram.

Processor 10 communicates data to/from a main memory 12 via bus 14 using any one of a number of conventional data transfer techniques. Memory 12 is presumed to store one or more software programs or routines, each comprising a sequence of instructions. Memory 12 is further assumed to store data related to the sequence of instructions. This data may include input data for use by the processor and/or result data stored in memory 12 by processor 10. Instructions are returned to processor 10 from memory 12 in response to an address indication from the processor. An address indication may take many forms, but a program counter (PC) is one well understood technique by which processor 10 indicate to memory 12 which location in memory (i.e., a memory address) stores the "next" instruction to be fetched.

As discussed above, the simple process of indicating a next instruction to be retrieved from memory becomes vastly complicated when one or more of the instructions is a branching instruction capable of indicating one next address under a one condition, or another next address under another condition. This is particularly true for pipelined processors.

Returning to FIG. 2, pipelined processor 10 generally comprises an instruction fetch unit 13 receiving an instruction (IR) from memory 12 and providing a predicted address (e.g., a program counter value) to memory 12. Instruction fetch unit 13 provides the instruction to an instruction decoder unit 15. Instruction decoder unit 15 decodes the instruction—generally providing at least an opcode portion of the instruction to an execution unit 17. The decoded instruction (or instruction portion) received in execution unit 17 initiates one or more operations in the execution unit. Such operations typically generate result data which is written-back to memory 12 or some other location in the system.

In addition to providing the instruction to instruction decoder 15, instruction unit 13 provides an instruction portion to a branch prediction unit 19. This instruction portion generally comprises an instruction address, but may include other information. Branch prediction unit 19 also receives a definitive "next address" indication from execution unit 17. That is, following execution of an instruction, the next instruction to be executed in the sequence of instructions is actually known (i.e., the condition of the branch instruction is determined). Accordingly, the next address indication is feedback to branch prediction unit 19. Using this information, branch prediction unit 19 determines whether the previously predicted next instruction is in fact the correct next instruction. The next address indication from execution unit 17 is typically an instruction address.

Where the next address indication from execution unit 17 matches the formerly predicted instruction address (e.g., a "HIT" condition), the processor continues forward with the pipelined sequence of instructions. If, however, the next address indication does not match the formerly predicted instruction address (e.g., a "MISS" condition), the processor flushes the pipeline and loads the instruction indicated by the next address indication.

Comparison of the next address indication with the formerly predicted instruction address is preferably performed in branch prediction unit 19. As described below in some additional detail, branch prediction unit 19 is also provided within pipeline processor 10 to provide a predicted address to instruction fetch unit 13.

Figure 3:
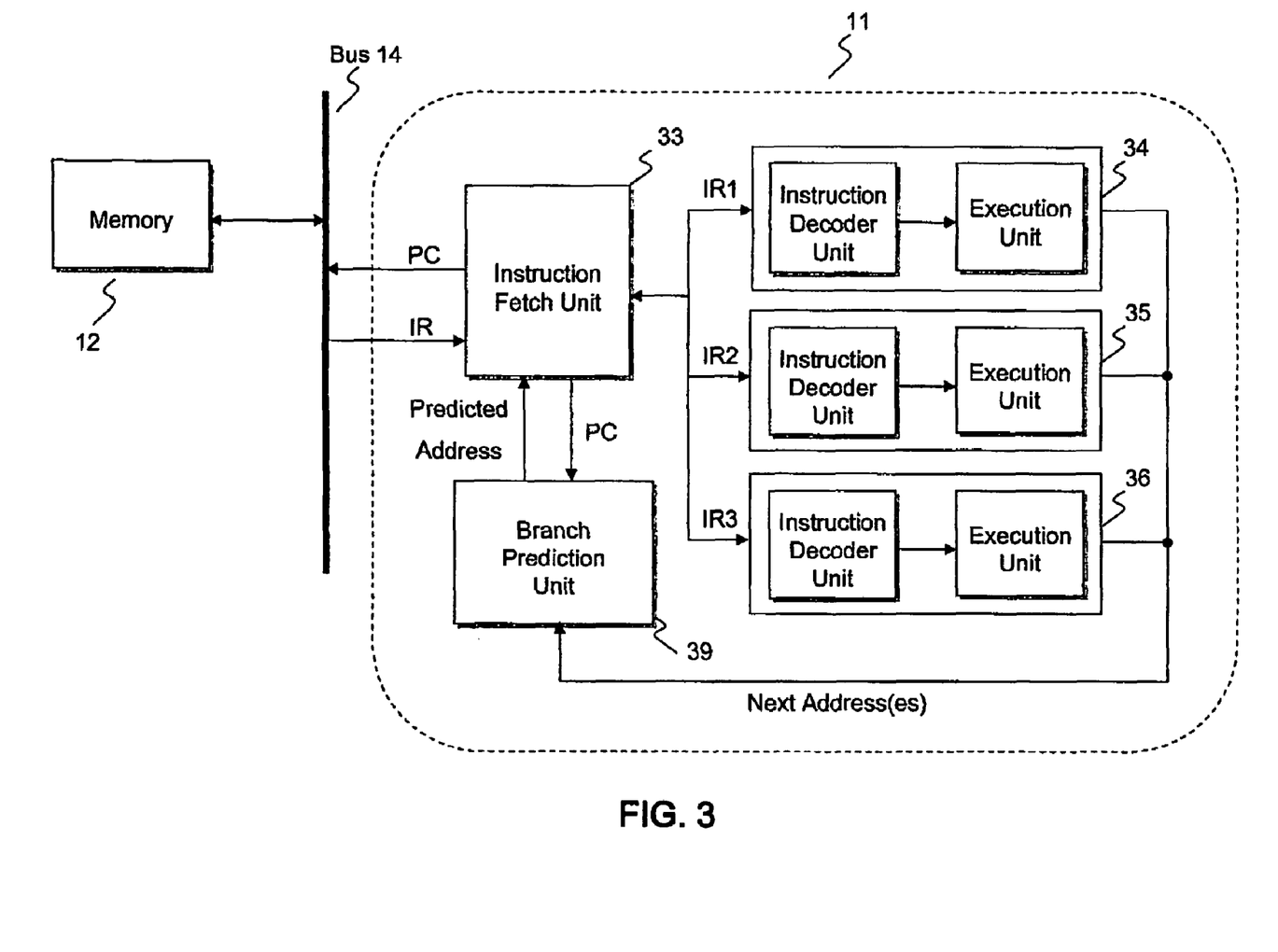
FIG. 3 is a block diagram of an exemplary superscalar processor readily adapted to incorporate a branch prediction unit and/or related methods according to the present invention.

Before continuing with a more detailed description of the preferred embodiments, it should be specifically noted that the present invention is also particularly well suited for superscalar processors. A greatly simplified superscalar processor is illustrated in FIG. 3. Here, memory 12 again feeds instructions and/or data to superscalar processor 11 via bus 14. Branch prediction unit 39 and instruction fetch unit 33 generally operate as described above, except instruction fetch unit 33 provides instructions to multiple execution paths 34, 35, and 36. Analogously, each execution path 34, 35, and 36 provides a next address indication to branch prediction unit 39.

In the illustrated example of a superscalar processor, three execution paths are shown, but this number is merely an exemplary and arbitrarily selected number. Further each execution path is characterized by a combined decoder/execution unit receiving instructions from a common instruction fetch unit.

The hardware and functional boundaries associated with the exemplary stages of the illustrated processors are entirely the subject of routine design choice by a designer. For example, decoding and execution functions may be readily performed in a single piece of hardware (e.g., an integrated circuit (IC)) or in multiple, co-operating ICs. Decoding and/or execution may be performed in hardware, software, firmware, or any combination of these three general platform types. Similarly, the hardware and/or functional boundaries between the instruction fetch units, instruction decoder units, and/or the branch prediction units in the presented embodiments are merely illustrative. Many adaptations and modifications to exemplary embodiments are contemplated within the context of the present invention.

Figure 4:
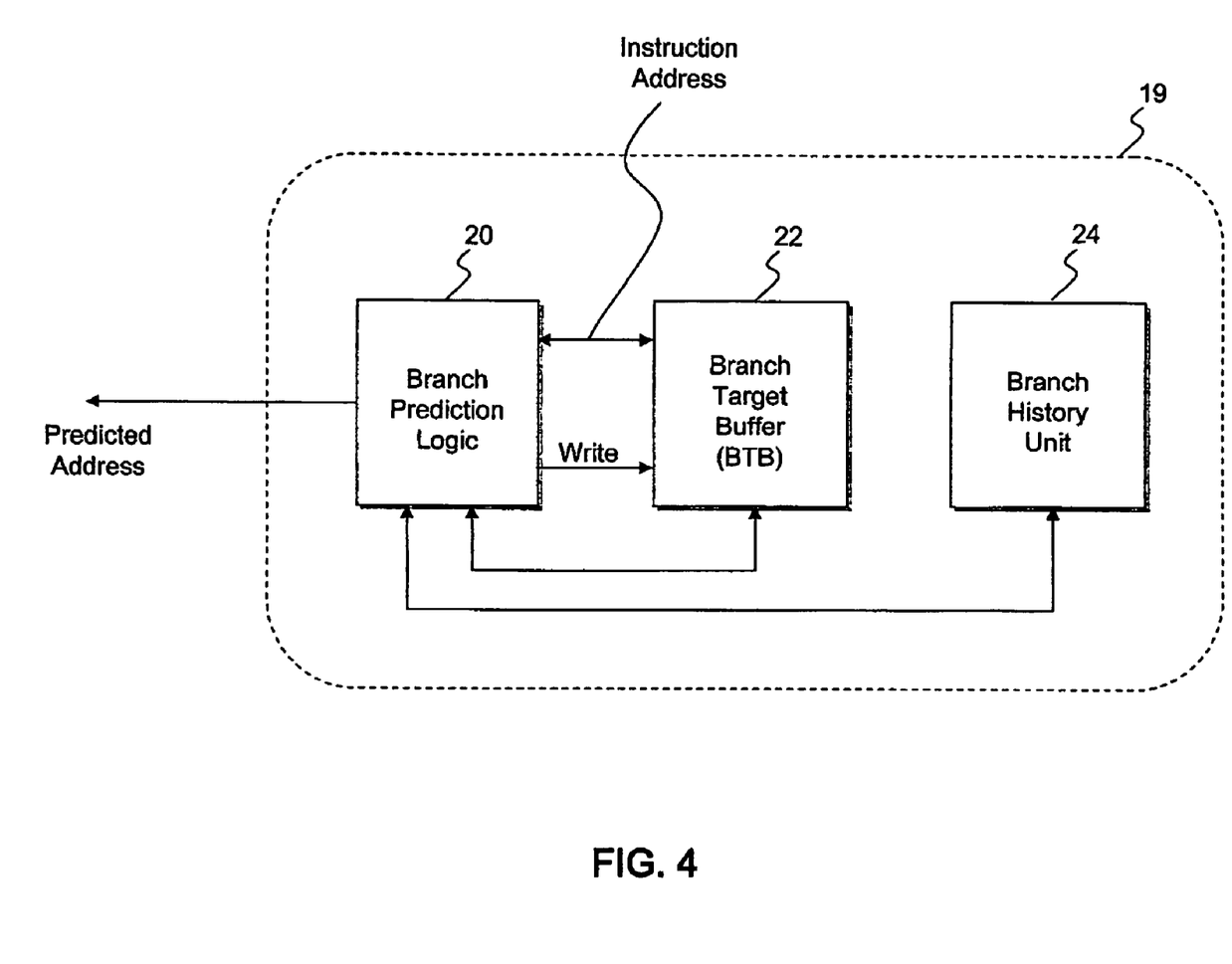
FIG. 4 is a block diagram further illustrating a branch prediction unit according to the present invention is some additional detail.

Regardless of the incorporating processor type, the present invention preferably provides a branch prediction unit comprising some form of branch prediction logic, some mechanism for storing data entries related to branching instructions, and some form of branch history data storage and/or computation. FIG. 4 further illustrates in block diagram form the branch prediction unit 19 shown in FIG. 3.

In FIG. 4, branch prediction logic 20 provides a predicted address which is typical output to at least instruction fetch unit 13. Branch prediction logic 20 receives an instruction address from the instruction fetch unit 13 and generally communicates information with branch target buffer (BTB) 22 and branch history unit 24. These three functional blocks have been selected for purposes of illustration. The present invention is not limited to this particular grouping of elements in a hardware sense. For example in practical implementations of the present invention, the data storage functionality associated with (and described below) branch history unit 24 might be combined within a memory array associated with BTB 22 or a memory device associated with branch prediction logic 20. Similarly, the computation functionality associated with branch history unit 24 might be implemented using hardware or software resources provided by branch prediction logic 20.

More specifically, branch prediction logic 20 receives an instruction portion, typically an instruction address (e.g. a current program counter value), from instruction fetch unit 13, and thereafter predicts whether the processor should branch to a target address associated with the instruction or execute the next instruction in the sequence of instructions. The term "predict[ion]" generally refers to a logical or computational output made by the branch prediction logic in relation to the received instruction address, and preferably in relation to branch history information associated with the received instruction address. Thus, branch prediction logic 20 may comprise many specific combinations of logic structures, computational circuits, data registers, comparison circuits, and/or similar hardware resources, and possibly embedded controller software to drive the hardware resources.

As presently preferred, branch prediction unit 20 provides a WRITE signal to BTB 22. The WRITE signal controls a WRITE operation within BTB 22. The terms "READ" and "WRITE" are used herein to generally describe respective operations that are well known in the operation of ordinary memory devices, such as a Static Random Access Memory (SRAM) and Dynamic Random Access Memory (DRAM).

A determination by branch prediction logic 20 to branch to the target address is termed a "Taken" condition. A determination by branch prediction logic 20 to not branch, but execute the next instruction in the sequence of instructions is termed a "Not-Taken" condition. Whether branch prediction unit 20 predicts a Taken or Not-Taken condition depends on the state of branch history data associated with the instruction indicated by the received instruction address.

Branch history unit 24 is responsible for the calculation, storage and/or provision of branch history data to at least branch prediction logic 20. Branch history data is any data useful in relation to a prediction between and a Taken and Not-Taken condition for a given instruction. Numerous conventional algorithms and methodologies have been presented which suggest differing approaches to the calculation of data indicative of whether or not a branch instruction will be taken. The present invention is susceptible to use of any one of these methodologies, so long as the algorithm or method provides an accurate prediction of branching instruction behavior.

The storage and provision of branching history data is preferably provided by a memory element associated with the branch history unit. Each branching instruction having a corresponding data entry stored in the BTB should preferably have some form of branching history data stored in the branch history unit. (However, as mentioned above, branch history data may be stored in the BTB along with the corresponding data entry). Branch history data for an instruction may be experimentally determined by running one or more programs containing the instruction in order to determine the frequency with which the instruction actually branches. Once initially determined this branch history data is stored in the branch history unit for subsequent reference. As presently preferred, initially determined branch history data, if any, is updated as necessary following each subsequent execution of the instruction. In this manner, contemporary branching behavior is used to update existing branch history data. Of course, branch history data need not be pre-determined in some manner, but may be generated "on-the-fly" in response to actual instruction executions.

Figure 5:
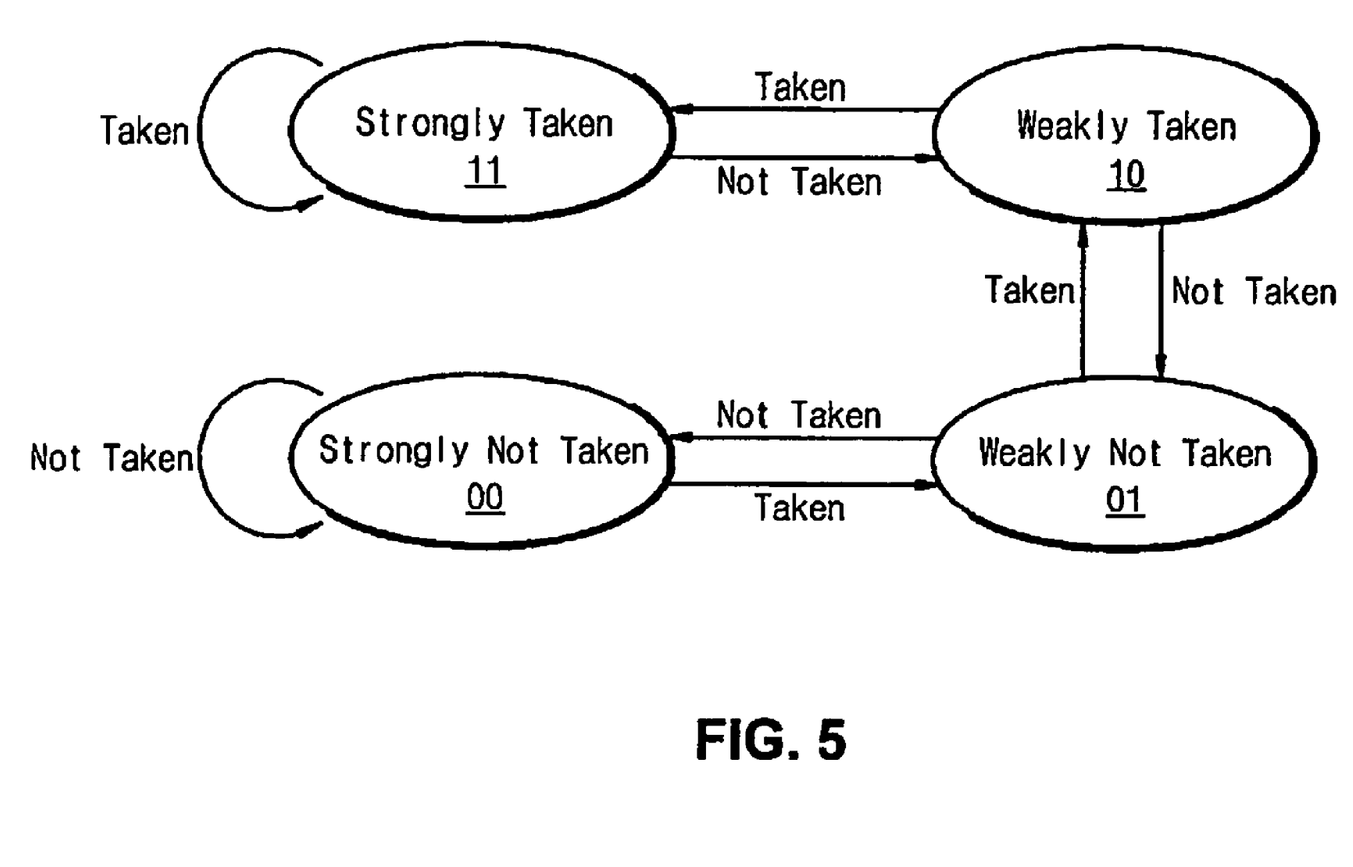
FIG. 5 is a flowchart illustrating a state machines susceptible to inclusion within a branch history unit according to the present invention.

Whenever determined and however updated, branch history data may be readily determined using a state machine. The complexity and design of a competent state machine is a matter of routine design choice. However, as presently preferred, the present invention incorporates a 2-bit, up/down saturation counter as the computational portion of branch history unit 24. The operation and use of the 2-bit, up/down saturation counter is illustrated in the flowchart of FIG. 5. Here, a 2-bit branch history data value is incremented or decremented following execution of a branching instruction in relation to whether the instruction was actual Taken or Not-Taken during execution. This branch history data indicates a particular degree of "Taken-ness" for the instruction.

For example, a previously non-Taken branching instruction moves from a "Strongly Not Taken" state to a "Weakly Not Taken" state are once being taken. This state change is indicated by incremented the corresponding branch history data value from "00" to "01". An instruction previously having a "Strongly Taken" state is changed to a "Weakly Taken" state by decrementing the corresponding branch history data value following an execution cycle in which the instruction was Not-Taken.

In the presently preferred embodiment, two bits have been deemed sufficient for most applications to accurately predict the likelihood of whether an instruction will be taken. However, this is not necessarily true for all applications—some of which may required a greater quantity (e.g., more data bits) of branch history data to make an accurate Taken/Not-Taken determination. Accordingly, the particular definition of branch history data is a matter of design choice, along with the selection of the algorithm calculating the branch history data, and/or a definition of a state machine implementing the selected algorithm.

Figure 6:
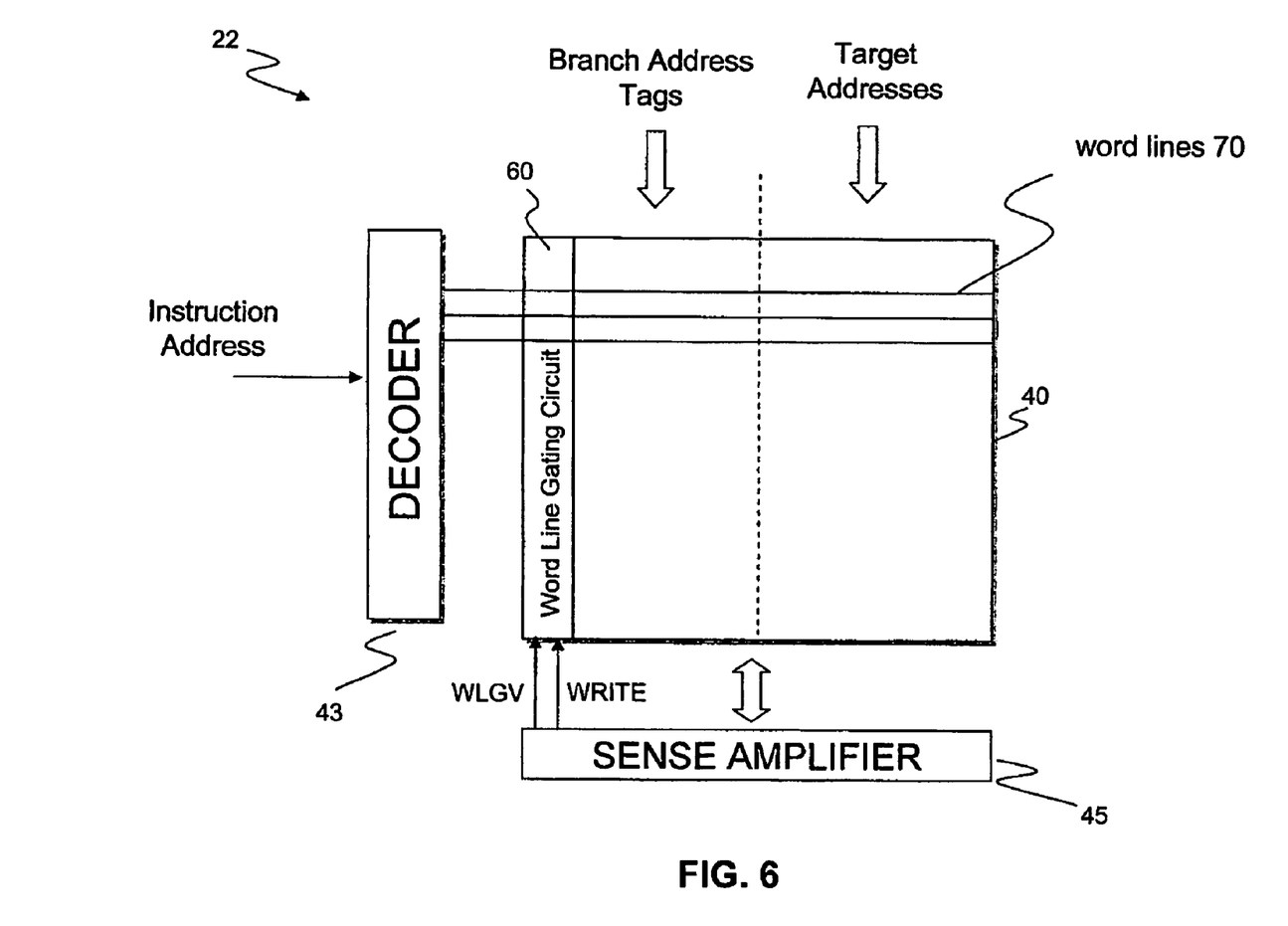
FIG. 6 is a block diagram illustrating one embodiment of a BTB memory array according to the present invention.

The BTB shown in FIG. 4 is described in some additional detail with reference to FIG. 6. Here, a decoder 43 receives an instruction portion, preferably an instruction address, and conventionally selects a word line indicated by the decoded instruction portion. Like the conventional BTB, a plurality of word lines extends from decoder 43 through memory array 40. However, the nature, operation, and implementation of the words line are altered in the present invention. The term "gated word lines" is used in relation to the several embodiments that follow to describe the word lines contemplated by the present invention.

Memory array 40 is preferably an array of non-volatile memory cells, such as SRAM cells, but other forms of memory cells may be used. Like the conventional BTB memory array, the memory array of the present invention preferably stores a plurality of data entries, wherein each data entry corresponds to an instruction and preferably comprises at least a branch address tag and a target address. Other types of data may be associated in each data entry, but generally speaking, some form of branch address tag and target address are required.

Figure 7:
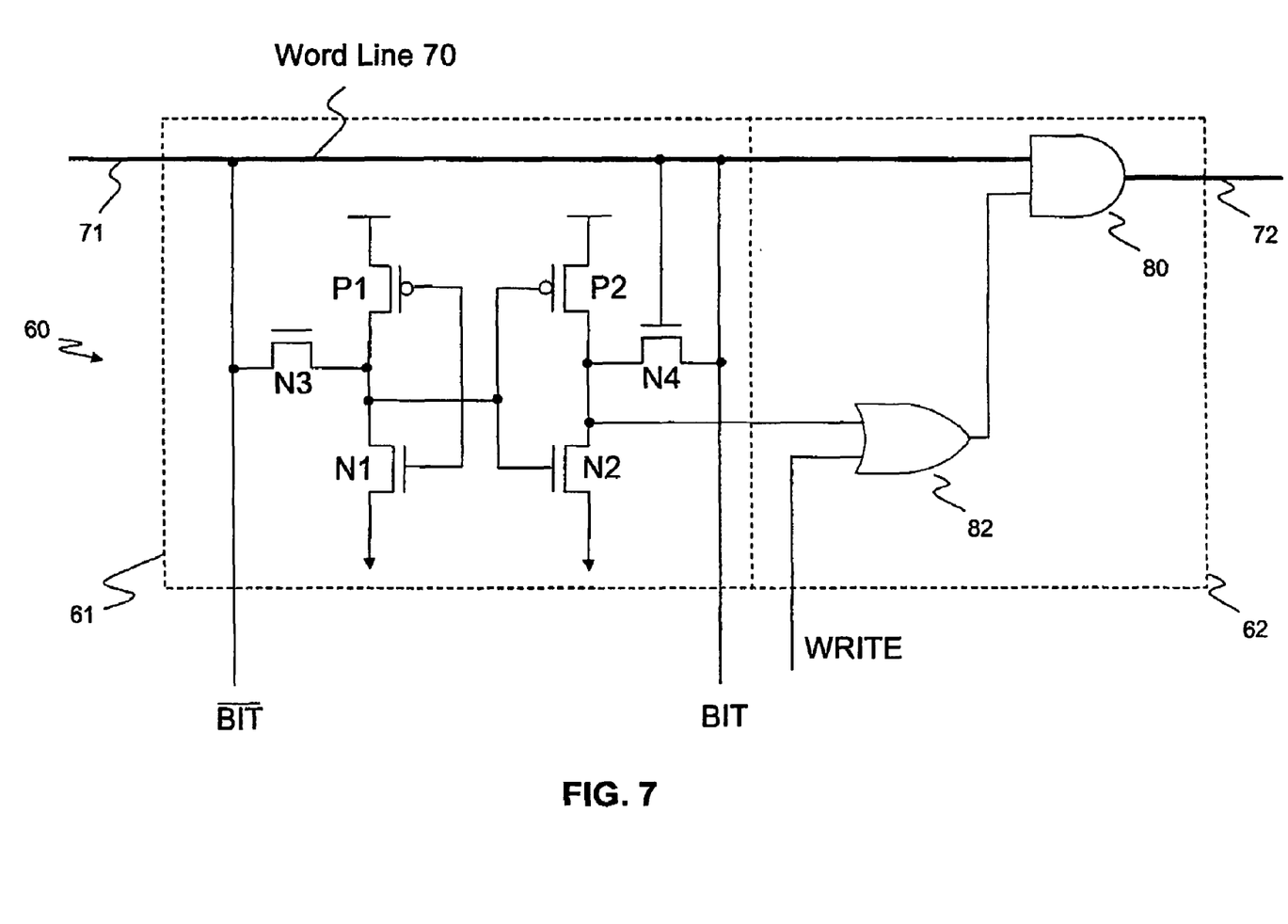
FIG. 7 is a circuit diagram further illustrating a gated word line structure according to one embodiment of the present invention.

A presently preferred gated word line is shown in FIG. 7. A gated word line generally comprises the combination of a word line 70 and a word line gating circuit 60. As illustrated in FIG. 6, the word line gating circuits are preferably associated on a one-for-one basis with a corresponding word line. The plurality of word line gating circuits are preferably configured in columnar fashion within memory array 40. This configuration allows easy update of the respective word line gating values stored in the word line gating circuits using conventional WRITE techniques. In one preferred embodiment, memory array 40 comprises an SRAM array and each word lone gating circuit comprises a memory circuit formed by a single bit SRAM cell.

The actual configuration of the word line gating circuit notwithstanding, each word line gating circuit functions to enable or disable access to a corresponding word line in accordance with a "word line gating value" derived from branch history data for the instruction associated with the word line. That is, each branching instruction portion received in BTB 22 selects a corresponding word line through operation of decoder 43. This word line stores a data entry including at least a branch address tag and a target address related to the received branching instruction portion. The corresponding word line selected by decoder 43 is a gated word line, i.e., a word line capable of being accessed only through the operation of an associated word line gating circuit, where operation of the word line gating circuit is controlled by a word line gating value stored in the word line gating circuit. This word line gating value is derived from branch history data associated with the instruction.

For each branching instruction, a word line gating value is preferably derived from the branch history data related to the instruction. An exemplary derivation method will be described in the context of the embodiments described above. This derivation method is only an example. Many different methods may be used to derive a word line gating value from branch history data, and these methods will vary in accordance with the nature of the branch history data, the algorithm used to define the branch history data, the size (e.g., number of bits) of the word line gating value, and/or the structure of the word line gating circuit and its constituent memory circuit.

Assuming 2-bit branch history data like that described with respect to FIG. 5, and further assuming a single bit memory circuit associated with each word line gating circuit, a competent word line gating value may be derived by simply using the most significant bit of the branch history data. In this example, a logic value of "1" for the most significant bit indicates a "Strongly Taken" or "Weakly Taken" state for the instruction. A logic value of "0" for the most significant bit indicates a "Weakly Not-Taken" or "Strongly Not-Taken" state for the instruction. By storing this bit value in a single bit memory cell associated with the word line gating circuit, an acceptably accurate indication of the instruction's degree of Taken-ness is used to control access to the gated word line.

Returning to FIG. 7, word line 70 is selected by a decoder, and in conventional manner a word line voltage is applied to word line 70. Normally, this applied word line voltage would raise the voltage potential across the entire length of word line. However, in the present invention, the application of word line voltage across the length of a selected word line is conditionally enabled by an associated word line gating circuit 60. Word line gating circuit 60 preferably comprises a memory circuit 61 and a gating logic circuit 62.

Memory circuit 61 will be sized according to the size of the word line control value to be stored. In the illustrated example, a single bit is stored. However, any reasonable size of word line control value might be stored and used to control access to the gated word line. In FIG. 7, a conventional SRAM memory cell comprising two (2) P-type transistors and four (4) N-type transistors is used for the memory circuit storing the word line gating value.

The logic value ("1" or "0") of the stored word line gating value is used as an input to gating logic circuit 62. Specifically, the word line gating value is applied as one input to a first logic gate 82 which also receives a WRITE signal from the branch prediction logic. Since the first logic gate is an OR-type logic gate, a logic value of "1" on either or both inputs will result in a first logic output of "1". The first logic output is applied to a second logic gate 80 along with the value of the word line voltage (i.e., a high or low voltage interpreted by the second logic gate as a logical "1" or "0", respectively). Since the second logic gate is an AND-type logic gate, both inputs must be "1" to result in a second logic output of "1". In the preferred embodiment, the second logic output from second logic gate 80 serves as a word line voltage for the portion of the word line 70 "behind" the operation of word line gating circuit 60.

Thus, word line 70 may be thought of as having two distinct portions; a selection word line portion 71 capable of being selected by a decoder in response to an instruction address, and a gated word line portion 72 capable of being accessed only through the operation of the word line gating circuit. In one embodiment, the selection word line portion is adapted to receive a word line voltage from the decoder. This word line voltage may be used as an input to the word line gating circuit associated with word line 70. Where conditionally enabled by the word line gating value stored in the word line gating circuit 60, this word line voltage is passed to the corresponding gated word line portion 72.

Conditionally passing (i.e., "gating") a word line voltage from a selection word line portion to a corresponding gated word line portion is preferably related to only READ operations applied to the word line. That is, where the word line gating value indicates branch history data predicting a branch instruction is likely to be taken, a READ operation applied to the selected word line is enabled. However, where the word line gating value indicates branch history data predicting the branch instruction is not likely to be taken, the READ operation applied to the selected word line is not enabled.

Such conditional "access operation" enablement is generally not necessary during a WRITE operation in which data entries stored in memory array 40 are updated. Accordingly, the application of the WRITE signal to the first logic gate immediately allows access to a gated word line when the gated word line is selected by the decoder. That is, the WRITE operation proceeds without regard to the word line gating value. In this manner, both conditional READ and unconditional (with respect to the word line gating value) WRITE operations are effectively facilitated with a minimum of hardware resources.

The exemplary BTB shown in FIG. 6 also comprises a sense amplifier 45 receiving a data entry from memory array 40 upon a successful (e.g., an enabled) READ operation. As presently preferred, sense amplifier 45 is also used to load (write or update) word line control values (WLCV) into respective memory circuits associated with the word line gating circuits.

Figure 8:
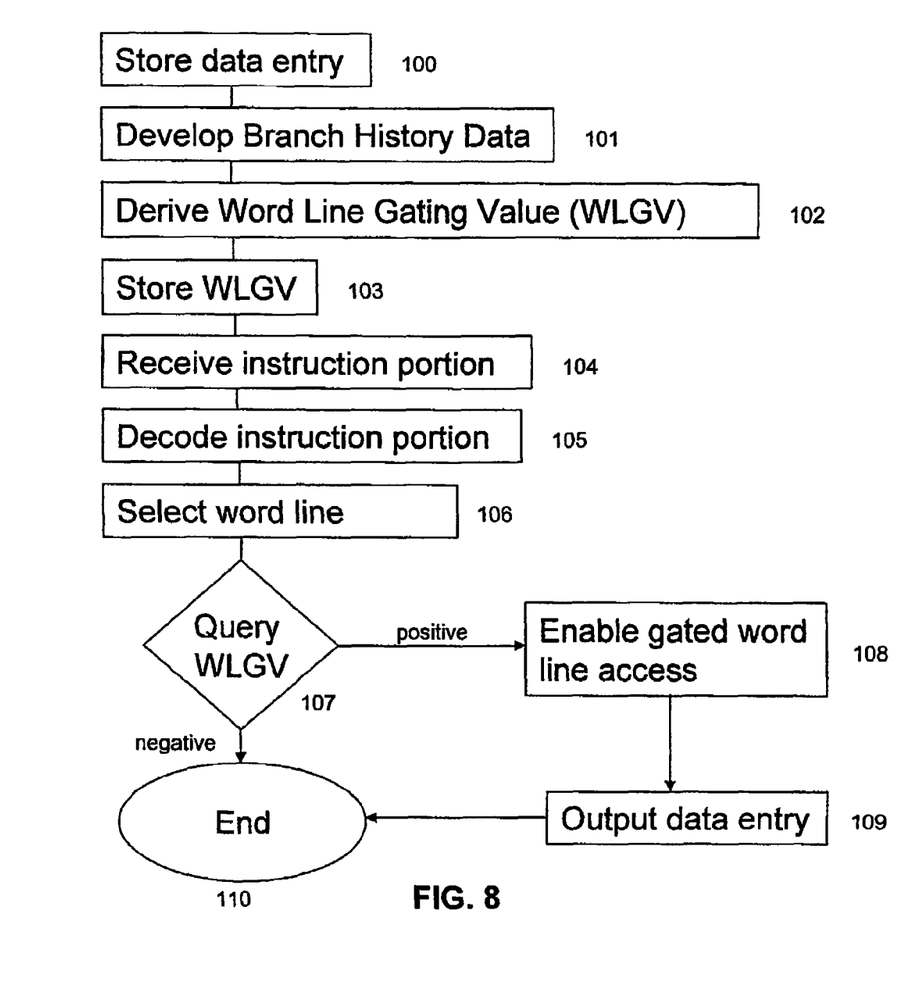
FIG. 8 is a flowchart illustrating one preferred method of operating a branch prediction unit according to the present invention; and, FIG. 9 is a graph illustrating benchmark simulation results for a branch prediction unit according to the present invention.

An exemplary method of operation for a branch prediction unit according to the present invention will now be described with reference to FIG. 8. Data entries corresponding to a plurality of branching instructions are stored in the memory array of the BTB (100). Branch history data for each of the instructions is developed using a competent algorithm (101). Respective word line gating values (WLGV) for each instruction are derived from the branch history data (102) and then stored in the memory circuit of a corresponding word line gating circuit (103).

With the data entries and word line gating values stored, the branch prediction unit is ready to receive an instruction portion, such as an instruction address (104). The instruction portion is decoded (105) and a corresponding word line is selected (106). With the word line selected, the stored word line gating value conditionally determines whether a gated portion of the word line is accessed. A "positive" word line gating value indication (i.e., an indication that the branching instruction is likely to be Taken) results in an enabled word line access (108) and output of the corresponding data entry (109). A "negative" word line gating value indication (i.e., an indication that the branching instruction is likely to be Not-Taken) results in no further access and resulting output by the memory array (110). The negative and positive indications referenced above will generally correspond to identified Taken/Not-Taken states for a particular instruction.

The foregoing examples illustrate the ease and efficiency by with a branch prediction unit designed in accordance the present invention is capable of receiving a branch instruction and conditionally enabling access to a corresponding data entry stored in a BTB. The data entry is only READ from the BTB where corresponding branch history data predicts that the data entry is likely to be needed. Instructions having a low probability of "taking" the branch do not result in an enabled READ operation to the BTB. As a result, power otherwise expended in unnecessary READ operations is conserved.

Figure 9:
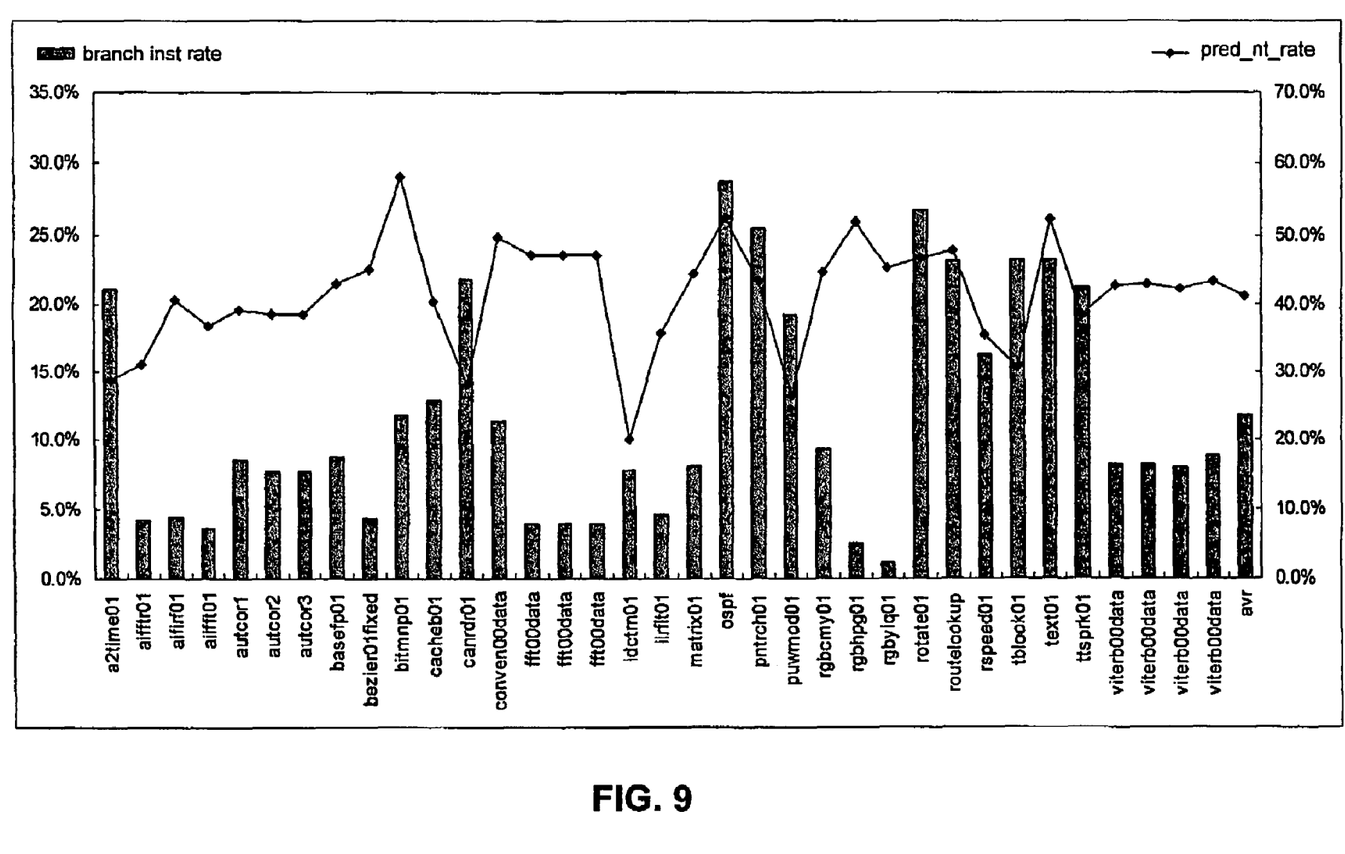

For example, FIG. 9 is a graph illustrating the results of a EEMBC benchmark simulation run using a branch prediction unit designed in accordance with the present invention. Over the series of benchmark routines indicated along the horizontal axis, a comparison is shown between a predicted rate of branch instructions and an actual rate of branch instructions. This particular simulation reveals that approximately 40% of branch instructions were associated with a "Not-Taken" state, and therefore BTB power consumption related to BTB memory array READ operations can be reduced by up to 40%.

Yet, the present invention does not provide power conservation at the price of increased complexity and reduced operating speed. When an instruction is received in the branch prediction unit it is immediately processed by a decoder, and where enabled, immediately thereafter generates a corresponding data entry output. There is no delay in the processing of the instruction in order to pre-code it, retrieve and/or calculate branch history data for the instruction, and only thereafter generate a signal enabling/disabling a corresponding READ operation to the BTB memory array. No complex additional circuitry or functionality is required in the present invention to conditionally enable READ operations to the BTB memory array.

Instead, a corresponding word line gating value "awaits" receipt of each instruction in the BTB. Application of the word line gating value within a simple word line gating circuit enables/disables access to a word line storing a data entry corresponding to the received instruction. The word line gating value may be readily and accurately updated in the word line gating circuit following each instruction execution.

As has been noted throughout the foregoing description, numerous deign changes, adaptations and modifications are possible with respect to the selected embodiments. The terms "preferred" and "preferably" are used throughout the foregoing description. Such terms merely indicate current preferences within the context of the teaching embodiments. These terms also recognize that as technology continues to progress other circuits, mechanisms, and methods will arise by and through which the present invention may be efficiently implemented.

What is claimed:

1. A processor, comprising:
   an instruction fetch unit to receive an instruction and provide a corresponding instruction address;
   a branch prediction unit to receive the instruction address and provide a predicted address to the instruction fetch unit; and,
   an instruction decoder/execution unit to receive the instruction, provide a decoded instruction, and provide an updated address in response to execution of the decoded instruction;
   wherein the branch prediction unit comprises:
      a branch history unit to store branch history data;
      branch prediction logic to receive the instruction address and the updated address, to provide the predicted address, and to update the branch history data; and,
      a branch target buffer to receive the instruction address and output a data entry, the branch target buffer comprising:
         a memory array comprising gated word lines, each gated word line connected to a corresponding word line gating circuit comprising a memory circuit storing a word line gating value derived from the branch history data.

2. The processor of claim 1, wherein the decoder/execution unit comprises a plurality of execution paths, each execution path comprising a decoder and an execution unit.

3. The processor of claim 2, wherein the processor is a superscalar processor.

4. The processor of claim 3, wherein the processor is a vector processor or a single-instruction-multiple-data (SIMD) processor.

5. The processor claim 1, wherein the branch prediction logic provides a WRITE signal to the branch target buffer.

6. The processor of claim 5, wherein the branch history unit comprises a state machine calculating branch history data for an instruction in accordance with its branching execution history.

7. The processor of claim 6, wherein the branch history unit comprises a branch history table storing the branch history data.

8. The processor of claim 1, wherein the memory array comprises an SRAM array, the memory circuit comprises a 1-bit SRAM cell, and the word line gating value comprises a single data bit derived from the branch history data.

9. The processor of claim 8, wherein the branch target buffer further comprises:
   a decoder to receive the instruction address and select a gated word line in response to the instruction address; and,
   a sense amplifier to receive the data entry from the selected gated word line, and comprising circuitry to communicate word line gating values to respective word line gating circuits associated with the gated word lines.

* * * * *